United States Patent
Alickaj et al.

(10) Patent No.: US 12,216,649 B2
(45) Date of Patent: *Feb. 4, 2025

(54) COPY AVOIDANCE VIA STATIC ANALYSIS FOR DBMS QUERYING

(71) Applicant: Oracle International Corporation, Redwood Shores, CA (US)

(72) Inventors: Altin Alickaj, Zurich (CH); Alexander Ulrich, Freiburg (DE); Lukas Stadler, Linz (AT)

(73) Assignee: Oracle International Corporation, Redwood Shores, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/589,052

(22) Filed: Feb. 27, 2024

(65) Prior Publication Data

US 2024/0273091 A1    Aug. 15, 2024

Related U.S. Application Data

(63) Continuation of application No. 18/109,781, filed on Feb. 14, 2023, now Pat. No. 11,947,531.

(51) Int. Cl.
  *G06F 16/22*    (2019.01)
  *G06F 16/21*    (2019.01)
  *G06F 16/242*    (2019.01)

(52) U.S. Cl.
  CPC ........ *G06F 16/2443* (2019.01); *G06F 16/217* (2019.01); *G06F 16/2219* (2019.01)

(58) Field of Classification Search
  CPC . G06F 16/2443; G06F 16/217; G06F 16/2219
  See application file for complete search history.

(56) References Cited

U.S. PATENT DOCUMENTS

| | | | |
|---|---|---|---|
| 6,985,901 B1 * | 1/2006 | Sachse | H04L 41/5032 709/224 |
| 2007/0185913 A1 | 8/2007 | Reichert et al. | |

(Continued)

OTHER PUBLICATIONS

Labs.Oracle.com, "Oracle Database Multilingual Engine", https://labs.oracle.com/pls/apex/f?p=94065:12:32018698560791:15, retrieved Jan. 7, 2023, 4 pages.

(Continued)

*Primary Examiner* — Merilyn P Nguyen
(74) *Attorney, Agent, or Firm* — Hickman Becker Bingham Ledesma LLP; Brian Miller

(57) ABSTRACT

In a computer embodiment, in a polyglot database management system (DBMS) that contains a guest language runtime environment, a database buffer is configured that the guest language runtime environment does not manage. In the polyglot DBMS, logic that is defined in a guest language is invoked to retrieve, into the database buffer, a value stored in a database in the polyglot DBMS. Compiling the logic causes semantic analyzing the logic to detect that usage of the retrieved value cannot occur after the retrieved value is overwritten in the database buffer. When detecting that such usage of the retrieved value cannot occur, the logic is executed without, after the retrieved value is overwritten in the database buffer, retaining a copy of the retrieved value in a memory region that the guest language runtime environment manages.

24 Claims, 5 Drawing Sheets

(56) References Cited

U.S. PATENT DOCUMENTS

2017/0322877 A1* 11/2017 Chan ..................... G06F 9/5027
2018/0018356 A1* 1/2018 Cranage ................. G06F 16/22

OTHER PUBLICATIONS

Cherem et al., "Compile-time Deallocation of Individual Objects", in Proceedings of the 5th International Symposium on Memory Management, dated Jun. 2006, 12 pages.

Choi et al., "Escape Analysis for Java", ACM SIGPLAN Notices, vol. 34, Iss. 10, dated Oct. 1999, 19 pages.

Demange et al., "Semantic Reasoning about the Sea of Nodes", in Proceedings of the 27th International Conference on Compiler Construction, dated Feb. 2018, 12 pages.

Diaconu et al., "Hekaton: SQL Server's Memory-optimized OLTP Engine", in Proceedings of the 2013 ACM SIGMOD International Conference on Management of Data, dated Jun. 2013, 12 pages.

Duboscq et al., "Graal IR: An Extensible Declarative Intermediate Representation", In Proceedings of the Asia-Pacific Programming Languages and Compilers Workshop, dated Feb. 2013, 9 pages.

Chaitin et al., "Register Allocation via Coloring", Computer Languages, vol. 6, Iss. 1, dated 1981, 11 pages.

Hicks, James, "Compiler-Directed Storage Reclamation Using Object Lifetime Analysis", PhD thesis, Massachusetts Institute of Technology, Dept. of Electrical Engineering, dated Oct. 1992, 183 pages.

Yurenko, Alina, "GraalVM", https://medium.com/graalvm, retrieved Jan. 17, 2023, 7 pages.

Lee et al., "Static Insertion of Safe and Effective Memory Reuse Commands into ML-like Programs", Science of Computer Programming, vol. 58, Iss. 1-2, dated Oct. 2005, 38 pages.

Oracle-samples.github.io, "MLE Bindings for Oracle Database DBMS_MLE (mle-js-bindings)", https://oracle-samples.github.io/mle-modules/docs/mle-js-bindings/21c/, retrieved Jan. 24, 2023, 2 pages.

Poletto et al., "Linear Scan Register Allocation", ACM Transactions on Programming Languages and Systems, vol. 21, Iss. 5, dated Sep. 1999, 19 pages.

Rivens, Andy, "Memoptimized Rowstore—Fast Lookup", https://blogs.oracle.com/in-memory/post/memoptimized-rowstore-fast-lookup, dated Apr. 2021, 10 pages.

Seaton, Chris, "Understanding Basic Graal Graphs", https://chrisseaton.com/truffleruby/basic-graal-graphs/, dated Jun. 2020, 55 pages.

Stadler et al., "Partial Escape Analysis and Scalar Replacement for Java", in Proceedings of Annual IEEE/ACM International Symposium on Code Generation and Optimization, dated Feb. 2014, 10 pages.

Eisl et al., "Parallel Trace Register Allocation", in Proceedings of the 15th International Conference on Managed Languages & Runtimes, Article No. 7, dated Sep. 2018, 7 pages.

\* cited by examiner ions or
the prosecution history thereof and advise the USPTO that
the claims in this application may be broader than any claim
in the parent application.

COPY AVOIDANCE VIA STATIC ANALYSIS FOR DBMS QUERYING

BENEFIT CLAIM

This application claims the benefit as a continuation of application Ser. No. 18/109,781, filed Feb. 13, 2023, by Altin Alickaj et al., the entire contents of which is hereby incorporated by reference. The applicant hereby rescinds any disclaimer of claim scope in the parent applications or the prosecution history thereof and advise the USPTO that the claims in this application may be broader than any claim in the parent application.

FIELD OF THE INVENTION

The present invention relates to polyglot database acceleration. Static analysis techniques herein are used in dynamic ways to avoid copying retrieved data into memory managed by a guest language runtime environment.

BACKGROUND

A stored procedure or a user-defined function (UDF) in a database management system (DBMS) may expose data stored in a database to an application program whose runtime is embedded in the DBMS. Values retrieved from the database may have a lifetime in the application program, and the extent of that lifetime might not be readily determined before executing the UDF. In the application program, a dangling reference to memory that no longer stores a still-needed retrieved value might occur if the retrieved value's lifetime is so long that an interfering retrieval of another value from the database overwrites the memory of the still-needed value. By defensively and unconditionally copying all values retrieved from the database, the state of the art never has a dangling reference.

The application program may have a stored procedure that processes rows retrieved by a full table scan in the database. Each retrieved row may be processed by a respective iteration of an internal loop in the stored procedure. Each iteration of the loop may load a respective next retrieved row into memory by overwriting a respective previous retrieved row in that memory. For example, the memory may be a row buffer with capacity to store only one row, which is the row of the current iteration of the loop. In that case, a memory reference to any field in the retrieved row of any previous iteration in the loop risks dangling. To prevent a dangling reference, overcautious copying of all retrieved values by the state of the art entails making copies of some (e.g. many or most) values whose lifetimes are so short that they are never used after the row buffer is overwritten. In that case, unconditional copying by the state of the art is wasteful of time and space as discussed herein. For example, collection of excess garbage generated by the state of the art may increase the magnitude and variance of latency for executing the stored procedure or the whole application program.

DETAILED DESCRIPTION

Figure 1:
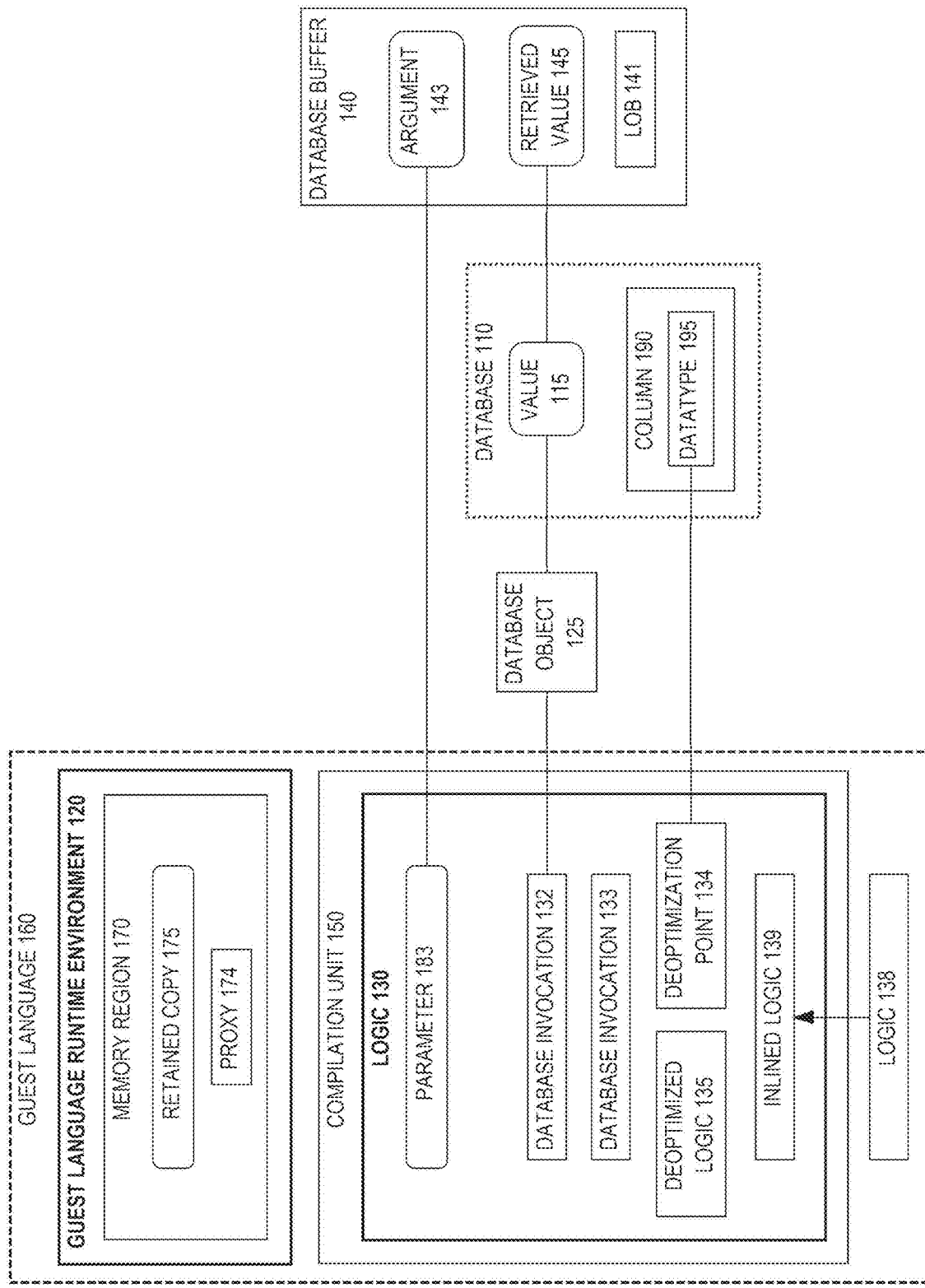
FIG. 1 is a block diagram that depicts an example polyglot database management system (DBMS) that uses static analysis of a compilation unit to avoid copying a retrieved value into a memory region that is managed by a guest language runtime environment.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Herein is novel conservation of time and space for a polyglot database management system (DBMS). Conservation of computer resources is based on static analysis techniques that are used in dynamic ways to avoid copying retrieved data into memory managed by a guest language runtime environment in the polyglot DBMS. Static analysis detects cases in which respective lifetimes of programming language references cannot possibly exceed the lifetime, within a memory buffer, of database content retrieved for those references. Those detected references have lifetimes so short that defensively copying their retrieved values into other memory is unneeded and, for conservation of time and space in novel ways herein, copying most or all retrieved values is entirely avoided.

The polyglot DBMS executes logic, such as user defined functions (UDFs) and stored procedures, that is written in a language that is not the native query language (e.g. structured query language, SQL) of the polyglot DBMS. For example, the logic may be written in JavaScript, which passes arguments to compound objects such as an array by reference, not by value. In that case, the logic may hold and use numerous references to values retrieved from a database and, as discussed in the Background herein, care must be taken by the polyglot DBMS to guarantee that none of those references ever is used after the reference becomes dangling.

Herein are novel techniques for static analysis of a compiler graph generated from parsed logic and, by rewriting the compiler graph, inserting instrumentation that provides selective copy avoidance based on that analysis. Special handling of database components, by instrumentation and other mechanisms, demonstrates various ways of deferring or avoiding, according to various optimizations, intensive activities such as memory copying, semantic analysis, and code generation. For example, a dynamic profiler of a guest language may eventually invoke a just in time (JIT) compiler to compile only a portion of logic, because compilation of that portion was previously deferred. Special automation is provided herein for a deoptimization point that may complicate static analysis and may expose advanced compilation infrastructure such as JIT.

In a computer embodiment, in a polyglot database management system (DBMS) that contains a guest language runtime environment, a database buffer is configured that the guest language runtime environment does not manage. In the polyglot DBMS, logic that is defined in a guest language is invoked to retrieve, into the database buffer, a value stored in a database in the polyglot DBMS. Compiling the logic causes semantic analyzing the logic to detect that usage of the retrieved value cannot occur after the retrieved value is overwritten in the database buffer. When detecting that such usage of the retrieved value cannot occur, the logic is executed without, after the retrieved value is overwritten in the database buffer, retaining a copy of the retrieved value in a memory region that the guest language runtime environment manages.

Example Polyglot Database Management System (DBMS)

FIG. 1 is a block diagram that depicts an example polyglot database management system (DBMS) 100, in an embodiment. In dynamic ways, polyglot DBMS 100 uses static analysis of compilation unit 150 to avoid copying retrieved value 145 into memory region 170 that is managed by guest language runtime environment 120. Polyglot DBMS 100 may be hosted by at least one computer such as a rack server such as a blade, a personal computer, a mainframe, a virtual computer, or other computing device. Polyglot DBMS 100 may contain one or more database servers, each of which may contain and operate one or more databases such as database 110.

Guest Language Runtime Environment

Polyglot DBMS 100 contains database 110 and guest language runtime environment 120 that is an execution environment with execution infrastructure needed to run execute logic that is defined in guest language 160 that is not the native database language of polyglot DBMS 100. For example, structured query language (SQL) or other domain specific language (DSL) for data access may be the native database language of polyglot DBMS 100. Guest language 160 may be a scripting language such as JavaScript or python or may be a general purpose programing language such as Java. Guest language 160 is shown with a dashed outline to indicate that guest language 160 is not itself a component (e.g. data or logic) contained in polyglot DBMS 100. Instead, guest language runtime environment 120 is contained in polyglot DBMS 100 and provides all of the functionality required by guest language 160 as follows.

The execution infrastructure of guest language runtime environment may include standardized runtime libraries, a language virtual machine such as a Java virtual machine (JVM), source (i.e. text) logic tools, and/or bytecode tools. Source logic tools may include some or all of a parser, a compiler, or an interpreter, some of which are or are not specialized for guest language 160. Bytecode is an intermediate representation (IR) for use as an instruction set architecture (ISA) of a language virtual machine that executes, by interpretation, each bytecode instruction individually in a bytecode sequence being executed.

Interpretation entails dynamically translating a source instruction (e.g. language statement) or bytecode instruction into a short sequence of a few machine instructions of an ISA of a central processing unit (CPU), and then the CPU executing the short sequence of machine instructions before interpretation of a next source or bytecode instruction. In an embodiment, guest language runtime environment 120 contains a source or bytecode interpreter that individually interprets source or bytecode instructions in logic 130 that is defined in guest language 160. For example, guest language 160 may be JavaScript, and logic 130 is human-readable text that contains sequences of JavaScript statements. In that case, logic 130 may be a script in a file in a filesystem or may be a script that is computed (i.e. dynamically generated) by polyglot DBMS 100 or provided by a client of database 110.

Retrieval of Database Content into Memory

Logic 130 may access database 110. Although guest language runtime environment 120 and polyglot DBMS 100 may operate in a same address space and a same operating system (OS) process, each of guest language runtime environment 120 and polyglot DBMS 100 may manage separate respective memory regions within that same address space. For example, memory region 170 is managed by guest language runtime environment 120, and database buffer 140 is in a different memory region (not shown) that instead is managed by polyglot DBMS 100.

Although both memory regions are managed by separate respective components, either of those components may, in some cases, access the memory region that is managed by the other component. For example, guest language runtime environment 120 and logic 130 may access any of elements 141, 143, and 145 that reside in database buffer 140 that is in the memory region managed by polyglot DBMS 100. That access into database buffer 140 provides accelerated execution of logic 130 as follows.

Database Buffer

In the state of the art and herein, database buffer 140 resides in a (e.g. volatile or nonvolatile) random access memory (RAM) medium. In an embodiment, that RAM is faster than a (e.g. persistent) bulk storage medium that is high capacity and used by database 110 to store value 115. Database 110 is shown with a dotted outline to indicate that, in some embodiments, database 110 resides in a storage medium that may be a same or slower RAM medium, a disk, or offloaded (i.e. remote) storage. In some embodiments, database buffer 140 stores a) exactly one retrieved row of a table in database 110 or b) from database 110, exactly one retrieved disk block or one retrieved database block, and that retrieved block contains column-major column(s) or multiple row-major rows.

In the state of the art and herein, database buffer 140 is frequently reused and its contents replaced with data to or from database 110. For example herein, access by logic 130 to value 115 stored in database 110 may cause polyglot DBMS 100 to load value 115 from database 110 into database buffer 140 as retrieved value 145 that is a copy of value 115. Because database buffer 140 is frequently reused, retrieved value 145 might be overwritten by other content from database 110 before logic 130 finishes executing. For that reason, the state of the art proactively makes, outside of database buffer 140, an additional copy of every value that is loaded for guest language 160 into database buffer 140, and that proactive copying occurs immediately when database buffer 140 is loaded with any value(s) to be used in guest language 160.

Novel Copy Avoidance

Likewise herein, guest language runtime environment 120 may copy any value(s) from database buffer 140 into memory region 170. For example, retained copy 175 may be a copy in memory region 170 of value(s) copied from database buffer 140. Retained copy 175 may be retained in memory region 170 even after database buffer 140 is reused and overwritten with other content from database 110. A disadvantage of retained copy 175 is the time and space needed to create it. Herein, avoidance of creation of retained copy 175 conserves time and space during execution of logic 130.

Conservation of time is further increased by conservation of space if management of memory region 170 incurs latency during allocation and/or deallocation (e.g. garbage collection) of retained copy 175 in memory region 170. In the cloud, RAM is more expensive than CPU, which means that compute-intensive copy avoidance herein decreases total operating cost of polyglot DBMS 100. Copy avoidance while scanning millions of values in database 110 may be an exemplary use case.

Example Javascript

To conserve time and space, polyglot DBMS 100 detects, in novel ways based on cooperation of polyglot DBMS 100 and guest language runtime environment 120, whether retrieved value 145 should be defensively copied into memory region 170 or, instead, that logic 130 may directly use retrieved value 145 in database buffer 140 without making a defensive copy. The following example JavaScript loop, which may occur in logic 130, demonstrates an opportunity for copy avoidance to accelerate any use, by logic 130, of local variable referenceToNextRetrievedArray that latches (i.e. is assigned) a reference to retrieved value 145 that, in this example, is an array of text strings.

```
let sumOfAAA = 0;
for (let i= 0; i< 500000; i++) {
   let referenceToNextRetrievedArray = databaseObject.get (i)
// [val1, val2, val3]
     if (referenceToNextRetrievedArray[0].startsWith ("AAA") ) {
       sumOfAAA++;
     }
}
```

In the above example JavaScript loop, databaseObject is database object 125 that mediates access to database 110 by logic 130 as discussed later herein. Loop iteration counter i identifies which string array to retrieve from database 110. Thus, get(i) retrieves a next string array from database 110. For example if the next string array is value 115, then get(i): a) loads value 115 by value into database buffer 140 as retrieved value 145 and b) returns a reference (e.g. a pointer to a memory address within database buffer 140) to logic 130 that latches the reference of retrieved value 145 as local variable referenceToNextRetrievedArray.

In other words, the text string array itself is returned to logic 130 by reference, not by value, even though the text string array was loaded from database 110 into database buffer 140 by value. In an embodiment making a retained copy is always avoided for a latched retrieved value of a primitive datatype (e.g. short integer) that is returned and latched by value to logic 130 instead of by reference.

When counter i is zero in a first iteration of the loop, a first text string array is loaded into database buffer 140. When count i is one in a second iteration of the loop, a second text string array is loaded into database buffer 140. A potential problem is that the loading content from database 110 into database buffer 140 in the second iteration of the loop may overwrite content in database buffer 140 from the first iteration, and such overwriting might require making a retained copy in memory region 170 of a retrieved value in database buffer 140. However, referenceToNextRetrievedArray is always used (i.e. dereferenced) only in the current iteration of the loop.

The lifespan of local variable referenceToNextRetrievedArray is limited to the current iteration because it is impossible, in this example, for the reference to retrieved value 145, which is the reference that referenceToNextRetrievedArray latches, to be used outside of the current iteration. In other words, the scope of availability of referenceToNextRetrievedArray has a provably limited extent that is observable by novel detections herein. Thus provably and detectably herein, retrieved value 145, as latched by local variable referenceToNextRetrievedArray, does not need a defensive copy to be made in memory region 170. Copy avoidance, based on that analysis of usage of referenceToNextRetrievedArray and of usage of database Object.get( ), accelerates execution of the above example JavaScript loop in logic 130.

Compilation

The decision to avoid copying may be facilitated by analysis of logic 130 as a whole that may be a technical challenge, especially if execution of logic 130 entails interpreting a previous instruction in logic 130 before analyzing a next instruction in logic 130. In an embodiment, parsing the next instruction does not occur until after execution (i.e. interpretation) of the previous instruction. In other words, analysis of logic 130 as a whole may be difficult if interpretation of logic 130 occurs through a so-called peephole of a single bytecode or source instruction (e.g. statement of a script).

Unlike interpretation that processes an individual source or bytecode instruction, compilation can collectively process a sequence of multiple source instructions. That collective processing during compilation of a sequence of multiple source instructions in logic 130 facilitates semantic analysis of a portion or whole of logic 130 as discussed herein to avoid creation of retained copies in memory region 170. Guest language runtime environment 120 may have a parser of guest language 150 that can parse logic 130 to generate a parse tree such as an abstract syntax tree (AST). Likewise, guest language runtime environment 120 may have a compiler of guest language 150 that, during static analysis, generates a compiler graph that can be semantically analyzed to avoid creation of retained copies in memory region 170.

Compiler Graph from Compiler Frontend

Herein, a compiler graph is a directed cyclic graph of intermediate representation (IR) nodes, and the directed cyclic graph can be analyzed as a dataflow graph and as a control flow graph that contains cycles such as a for loop and conditional paths such as an if-else branch. Herein, a compiler graph or IR graph may be semantically analyzed and rewritten by addition, replacement, or adjustment of IR nodes during compilation of a portion or whole of logic 130. General techniques for rewriting compiler graphs are presented in "Understanding Basic Graal Graphs" that is incorporated herein in its entirety and published by Chris Seaton on Jun. 3, 2020 at https://chrisseaton.com/truffleruby/basic-graal-graphs. Novel and specialized rewriting techniques are presented later herein.

Polyglot DBMS 100 may contain a hybrid tool that combines an interpreter of guest language 160 with a parser that can parse logic 130 to generate, without generating executable code, a parse tree that the interpreter may use for execution. The interpreter may traverse the parse tree to individually interpret (i.e. process and execute) each parse node in the parse tree, and execution by interpretation herein may be referred to as tree interpretation by a tree interpreter. Polyglot DBMS 100 may retain the parse tree for interpretation or for tactical compilation. A just in time (JIT) compiler may dynamically decide to generate a compiler graph from a subtree of the parse tree, and then compile the compiler graph into object code. Because the object code does not represent the whole parse tree, execution of the parse tree may entail execution of object code for the compiled subtree and execution by interpretation for other parts of the parse tree. Compilation involving an IR graph herein may be referred to as graph compilation by a graph compiler. Unlike a retained parse tree that is retained for subsequent interpretation and compilation, a compiler graph exists only during a current compilation. Thus, all static and semantic analysis and rewriting herein occurs during compilation by a compiler, which typically is the only time that an IR graph exists.

Backend Interpretation and Object Code Generation

In an embodiment, guest language runtime environment 120 may contain a semantic analysis and rewriting framework that may be generalized to not depend on which language is guest language 160. For example, different guest languages may have separate respective parsers that generate parse trees from which a compiler can generate language-independent compiler graphs that can be analyzed and rewritten in a language-independent way.

For purposes herein, JVM bytecode or low-level virtual machine (LLVM) bitcode is so-called object code. Object code contains low level instructions (e.g. bytecode or machine instructions) that are not analyzed herein. A code generator (i.e. backend of a compiler) may generate object code that is an executable representation of logic 130. Techniques such as just-in-time (JIT) compilation may convert bytecode into machine code for direct (i.e. without interpretation) execution on a CPU. For example, logic 130 may be Java, and a frontend of a compiler may eventually generate, from a retained parse tree of logic 130, a compiler graph of IR nodes for analysis and rewriting herein, and from the rewritten IR, bytecode may be generated by the backend of the compiler, and the bytecode may be interpreted or further compiled into machine code. Alternatively, an embodiment of a backend herein may generate machine code directly from the compiler graph, without generation of bytecode. In other words, object code may be bytecode or machine code.

Analysis herein is based on the compiler graph and not the object code nor the parse tree, and analysis herein completes more or less immediately before the corresponding object code is generated. For example, object code may lack semantic or syntactic information that the compiler graph contains.

Database Object and Rewriting Database Invocations

A rewritten (i.e. optimized) compiler graph is the result of semantic analysis and modification (i.e. rewriting) such as in novel ways proposed herein, including novel instrumentation. Orchestration of database usage is based on rewriting the compiler graph.

As discussed above, logic 130 is originally composed of source instructions. Database invocations 132-133 are contained in (i.e. specified by) respective source instructions. Database invocation 132 specifies retrieving value 115 from database 110. When executed, database invocation 132 implicitly (i.e. by operation of polyglot DBMS 100) causes value 115 to be loaded into database buffer 140 as retrieved value 145. In an embodiment discussed later herein, all database invocations from guest language 160 use an instance of database object 125 to access database 110. Usually, all database invocations 132-133 in logic 130 use a same instance of database object 125, but logic 130 may invoke or be invoked by other logic that may use a same or different instance of database object 125, which may affect semantic analysis as discussed later herein.

Key-Value Store

In various embodiments, database object 125 provides, to logic 130, an interface such as: a) an embedded database driver more or less similar to a client database driver and possibly used as a generator or relay (i.e. from logic 130) of SQL statements for polyglot DBMS 100 to execute on database 110, b) a query interface that accepts only filtration criteria such as a WHERE clause of a SQL SELECT statement, c) a query by example (QBE) interface, d) a create, read, update, and delete (CRUD) interface, and e) a key-value store.

In an embodiment, database object 125 is a façade that exposes database 110 to logic 130 only as a key-value store. For example if the key-value store is exposed as immutable (i.e. read only) then, after initialization of database object 125 as discussed later herein, the sole function exposed by database object 125 is a get( ) method that accepts a lookup key as a sole argument. Invoking get( ) causes value 115 to be loaded into database buffer 140 as retrieved value 145 that is returned by get( ) to logic 130. For example, database invocations 132-133 may be separate invocations of the get( ) method on a same instance of database object 125.

Referential Proxy

A compiler graph of a portion or whole of logic 130 may be rewritten (i.e. adjusted by movement, removal, and/or addition of graph nodes) in ways that do not affect the original behavior of logic 130. Compiler graph rewriting may be used to insert various instrumentations into the compiler graph to avoid creation of retained copies in memory region 170. In an embodiment, access to retrieved value 145 by logic 130 should occur through proxy 174 that resides in memory region 170. Proxy 174 provides generalized access to retrieved value 145 regardless of whether retrieved value 145 does or does not have a defensively-made retained copy in memory region 170. In other words, logic 130 can use proxy 174 without knowing whether the value actually being accessed resides in memory region 170 (e.g. retained copy 175) or instead resides in database buffer 140 (e.g. retrieved value 145).

Later herein is buffer promotion in which proxy 174 may initially contain a reference to a retrieved value in database buffer 140 and later, during the same execution of logic 130, transparently (i.e. without logic 130 knowing) switch to instead referencing memory region 170 for the same retrieved value. For example, a same execution of logic 130 may repeatedly use proxy 174 that always returns a reference to a same value. As an example of buffer promotion, an earlier use of proxy 174 in an execution of logic 130 may return a reference to a value in database buffer 140, and a later use of same proxy 174 in the same execution of logic 130 may return a reference to that same value instead in memory region 170. Buffer promotion is discussed later herein.

Instrumentation

Herein, instrumentation may be a combination of 1) graph nodes modified or generated by rewriting and 2) an accompanying code library dedicated solely to providing additional mechanisms when invoked from the generated graph nodes. The compiler graph may be rewritten to insert instrumentation such as any or all of these example instrumentations:

a) allocation or deallocation of proxy 174 in memory region 170, b) insertion and use of a new global or local variable to track instrumentation status (e.g. buffer promotion later herein), c) replacement of an invocation of a first get( ) method that returns retrieved value 145 with an invocation of a second get( ) that instead returns proxy 174, and d) replacement of: 1) an assignment of a variable in logic 130 that latches a reference (e.g. memory address pointer) to retrieved value 145 in database buffer 140 as returned by the first get( ) method with 2) an assignment of the variable in logic 130 that instead latches a reference to proxy 174 in memory region 170 as returned by the second get( ) method.

Operation of proxy 174 for buffer promotion based on another instrumentation example is presented later herein. Retrieved values from database 110 are not the only data that logic 130 may access in database buffer 140. For example, logic 130 may be a subroutine that has formal parameter(s) whose arguments (i.e. actual values) are dynamically provided by polyglot DBMS 100 when polyglot DBMS 100 invokes the subroutine. For example, the subroutine may be a user defined function (UDF) that is re-invoked for each value in column 190 in database 110.

Retained Parse Tree

A client that uses a database driver, instead of database object 125, may submit a SELECT query that contains a WHERE clause that applies the UDF to column 190 for filtration. Such a column scan repeatedly invokes the UDF (i.e. logic 130), once for each value in column 190. As discussed earlier herein, a compiler graph may be generated from a subtree of an interpretable retained parse tree.

The retained parse tree may, when logic 130 is executed, eventually be used to generate a compiler graph that can then become extremely optimized (i.e. rewritten) solely for this particular execution of logic 130, after which the optimized clone may or may not be immediately discarded. Because the UDF (i.e. logic 130) is invoked for each value in column 190 during a column scan, each value in column 190 may be processed by its own respective distinct instance of logic 130 that is extremely optimized solely for handling that particular value being passed as argument 143 that logic 130 can be use as parameter 183 as discussed below.

Specialized Compilation Per Invocation

For example, column 190 may store postal zip codes, and the UDF (i.e. logic 130) may have processing alternatives (e.g. if statements) that are specialized by city, state, and time zone, all of which are based on subsets (e.g. ranges) of zip codes, and those subsets of zip codes may be hardcoded as constants in conditions in logic 130. Because one instance of logic 130 should be specialized to receive one particular zip code as parameter 183, intensive optimization of that instance of the compiler graph is facilitated by parameter 183 that is the current value from column 190.

All lexical blocks in logic 130 that are conditioned on parameter 183 being the current value are analyzed as elsewhere herein. All lexical blocks in logic 130 that are conditioned on parameter 183 instead not being the current value, are analytically certain (i.e. not speculatively) dead code that can be pruned (i.e. removed from that instance of the compiler graph by rewriting) without inserting a deoptimization point, which otherwise would unfortunately introduce a point of escape as discussed later herein. In other words, each of those optimized instances of the compiler graph are smaller and execute faster than an optimized compiler graph could if optimized without parameter 183, and those optimized instances may each be executed once and discarded.

Database Cursor

For example, a thread (e.g. database session) may submit, to polyglot DBMS 100, a SQL statement that once or repeatedly invokes logic 130 as a UDF. Regardless of what kind (e.g. DML, data query language, DQL, or data definition language, DDL) is the SQL statement, polyglot DBMS 100 may allocate one database cursor for exclusive use during execution of the SQL statement. The database cursor and the compiler graph may reference each other. Query parsing may precede parsing logic 130. Query planning and plan optimization may occur before, concurrently, or after generation of the compiler graph.

In that way, each invocation of logic 130 may have a separate value from column 190 as an argument that logic 130 accepts as formal parameter 183. For example, column 190 may contain two values, and the database cursor may maintain an offset into column 190 for a column scan that causes both values to be separately provided in sequence as parameter 183. Logic 130 may be invoked twice, which is once with argument 143 for parameter 183 and a second time instead with a different argument value for same parameter 183.

Dangling Reference

If logic 130 directly or indirectly (i.e. by escape as discussed later herein) causes retention of a reference to argument 143 in a static variable, then that reference would become dangling when database buffer 140 is overwritten by a subsequent database invocation in a same execution of logic 130. To prevent dangling references, usage by logic 130 of values in database buffer 140 such as argument 143 and retrieved value 145 should be analyzed to discover which of those values are or are not used by logic 130 in ways that can cause a dangling reference to an overwritten value.

Besides being catastrophic, a dangling reference can potentially be used (i.e. dereferenced) without necessarily causing a detectable error such as throwing an exception. For example, using a dangling reference that initially pointed to argument 143 may, when dereferenced, instead wrongly access other data that overwrote needed data in database buffer 140, or database buffer 140 is wrongly accessed despite being recently discarded or reassigned for another purpose. Any of these malfunctions do not necessarily raise an error, which is why these malfunctions should never occur by design.

Dangling references are never generated herein nor by the state of the art. However, avoidance of dangling references by the state of the art is expensive in time and space because the state of the art overcautiously implements 1) all references in logic of guest language 160 to buffered database data instead as 2) references to retained copies of the data, which must be expensively copied from a database buffer into memory dedicated to guest language 160. That exhaustive and proactive retention by the state of the art entails making a retained copy of many buffered values for all references without knowing which references actually could become dangling, which is wasteful because many or most references are not used in ways that can cause the references to dangle.

Incremental Just in Time (JIT) Compilation

As explained later herein, dynamic use of static analysis techniques detect many or all references whose usage by logic 130 cannot cause the reference to dangle. Static analysis may entail semantic analysis of a compiler graph of compilation unit 150 that contains a portion or whole of logic 130. The extent of compilation unit 150 may vary. For example, logic 138 is referenced by logic 130 but is not originally contained in logic 130. To accelerate the execution of logic 130, the compiler may inline logic 138 into logic 130 as inlined logic 139. In that way, whether or not logic 138 is contained in compilation unit 150 depends on whether or not the compiler chooses to inline logic 138 as inlined logic 139.

Incremental just in time (JIT) compilation may also cause the extent of compilation unit 150 to vary. For example in one compilation, compilation unit 150 may contain all of logic 130. In another compilation, compilation unit 150 instead contains only a portion of same logic 130 that was not yet compiled. Logic 130 may contain multiple JavaScript include statements that may cause JavaScript of a third-party library to be inserted into compilation unit 150, and one JavaScript library may include, into compilation unit 150, multiple other JavaScript libraries, in which case compiler graph pruning techniques such as dead code elimination and speculative deoptimization points may be important for decreasing the size of the compiler graph and thus accelerate all compilation phases and execution of logic 130.

For example upon a first invocation of logic 130, a parser may parse all of logic 130 as a preface to interpreted execution, and later (e.g. even while interpretation is ongoing) the JIT compiler may optimally recompile a for loop, or other statement or lexical block (i.e. sequence) of statements to accelerate the loop. The loop may have millions of iterations such as one for each value in column 190 during a single invocation of logic 130, such as when logic 130 is a stored procedure that is scheduled, triggered, or invoked ad hoc to fully scan column 190. Thus, JIT and compilation unit 150 may be localized to a portion (e.g. internal loop) of logic 130, and JIT may incrementally optimize to alleviate some portions that are so-called hot spots that are computational bottlenecks, such as identified by counters and thresholds of a dynamic profiler in guest language runtime environment 120. Herein, each JIT compilation generates a new compiler graph that corresponds to the extent of compilation unit 150 that may correspond to a subtree of the parse tree of logic 130.

Dynamic Profiler

When generating a compiler graph from a particular subtree of a retained parse tree, the compiling subtree may contain a nested subtree, shown as deoptimized logic 135, that may be excluded from compilation. That is, the nested subtree is not compiled and no subgraph is generated in the compiler graph for the nested subtree, even though the compiler graph is generated for compiling subtree that contains the nested subtree. Initial execution of logic 130 may occur by slow interpretation. Tools in guest language runtime environment 120 may include a dynamic profiler that may count how many times each lexical block executes. Most lexical blocks are executed only once, a few times, or not at all. For example in a demonstrative linear control flow, every pair of if-else blocks contains a block that does not execute.

Execution counts of blocks are compared to a threshold so that only heavily repeated blocks are opportunistically compiled to object code by a JIT compiler. While a high execution count may cause code generation to avoid interpretation, a zero execution count (e.g. an unused if block, else block, catch block, or switch case) instead may speculatively (i.e. optimistically) be treated as dead (i.e. unreachable) code until that speculation is violated when the unused block is unexpectedly used. By rewriting during JIT compilation, the subtree of the parse tree that represents speculatively presumed dead code, such as deoptimized logic 135, may be replaced with deoptimization point 134 that is a graph node that has the following two purposes.

Deoptimization Based on Database Content

Deoptimization point 134 serves as a cap that prunes (i.e. removes) deoptimized logic 135 from the compiler graph of compilation unit 150. Deoptimization point 134 also serves as a placeholder in case deoptimization logic 135 needs to execute by interpretation as discussed below. To accelerate compilation and decrease object code size that also provides acceleration by not thrashing a hardware cache of a CPU, no object code is generated for a subtree of the parse tree that has been replaced in the compiler graph by a deoptimization point. Those accelerations occur in the following example that combines deoptimization with datatype 195 of database 110.

For example, database 110 may be an Oracle database, and datatype 195 may be Oracle's proprietary number datatype whose values almost all can be stored in one or two machine words. However, some Oracle number values need more space such as an integer of great magnitude or a real number of great precision. During repeated interpretation of a pair of if-else blocks in logic 130 that randomly accesses a few numeric values stored in column 190 whose values are all of datatype 195 (e.g. Oracle number), dynamic profiling may detect that the else block that handles numbers that are too big has, so far, never been used.

In that case, the unused else block may be speculatively replaced with deoptimization point 134. However, column 190 may contain a still un-accessed number that is too big. Alternatively, column 190 might not have contained a number that is too big when deoptimization point 134 was added into the compiler graph, but a number that is too big may have been inserted into column 190 afterwards, such as between two invocations of logic 130. In either case, logic 130 may eventually access the number that is too big in column 190, which causes execution by interpretation of deoptimized logic 135. Interpretation of uncompiled deoptimized logic 135 correctly processes the retrieved number that is too big.

Large Object (LOB)

As discussed earlier and later herein, indirect access by logic 130 to retrieved value 145 may occur through proxy 174. Large object (LOB) 141 is a different form of indirect access to retrieved value 145 for use when retrieved value 145 is of a LOB datatype of database 110 such as a binary LOB (BLOB) or a character LOB (CLOB). The primary purpose of a database LOB is to accommodate a huge value (e.g. too big to fit into database buffer 140). For example, a BLOB value may be a photograph (i.e. graphical image) that contains millions of pixels.

However, other graphical images (e.g. icons and thumbnails) are small. If datatype 195 of column 190 is BLOB to store graphical images as values, then logic 130 may use LOB 141 in database buffer 140 to retrieve a large image value that database 110 may provide without using database buffer 140. Whereas, for a small graphical image also stored in same column 190, the small image may itself be contained in LOB 141 in database buffer 140. That is, retrieved value 145 may be contained in LOB 141, and logic 130 may use LOB 141 to access retrieved value 145. Regardless of whether LOB 141 does or does not contain retrieved value 145, LOB 141 itself should be treated as a retrieved value whose usage should be analyzed to detect whether or not a retained copy of LOB 141 in memory region 170 should be made to avoid a dangling reference to LOB 141 itself. Because proxy 174 may defer such copying of LOB 141 until buffer promotion, logic 130 may use proxy 174 to indirectly access LOB 141 to indirectly access retrieved value 145 that, until buffer promotion, is in database buffer 140. Buffer promotion based on proxy 174 is discussed later herein. Unlike proxy 174 that is defined within guest language runtime environment 120, LOB 141 is a database interface and a data structure provided instead by polyglot DBMS 100.

Example Copy Avoidance Process

Figure 2:
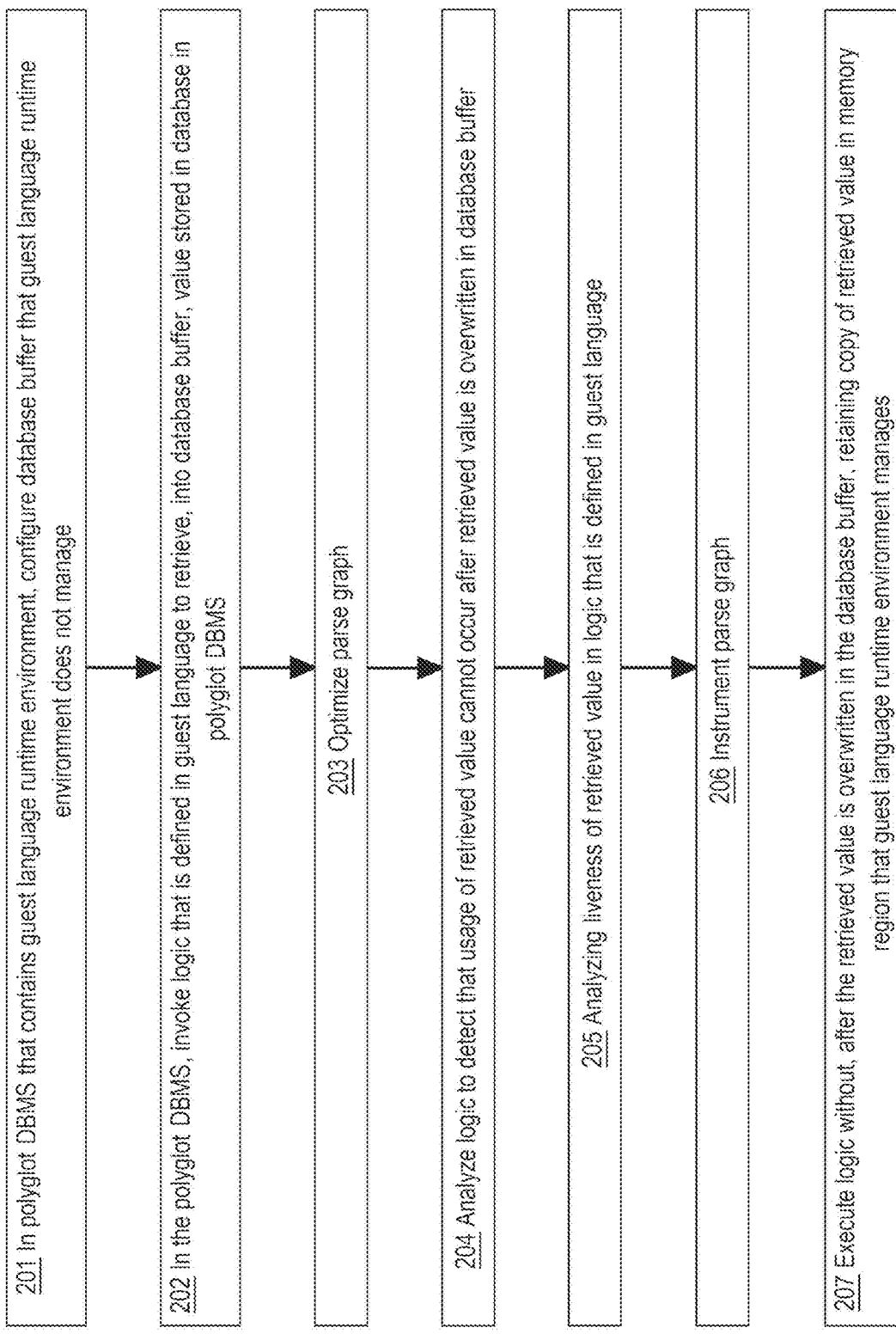
FIG. 2 is a flow diagram that depicts an example computer process that uses static analysis of a compilation unit to avoid copying a retrieved value into a memory region that is managed by a guest language runtime environment.

FIG. 2 is a flow diagram that depicts an example computer process performed by polyglot DBMS 100. The process of FIG. 2 uses static analysis of compilation unit 150 to avoid copying retrieved value 145 into memory region 170 that is managed by guest language runtime environment 120, in an embodiment. FIG. 2 is discussed with reference to FIG. 1.

Step 201 configures database buffer 140 that guest language runtime environment 120 does not manage. For example, database buffer 140 may reside in an idle pool of reusable database buffers, and polyglot DBMS 100 maintains the pool in RAM that is managed by polyglot DBMS 100 and not managed by guest language runtime environment 120. Without movement in RAM, the database buffers may individually leave and reenter the idle pool respectively for use and disuse of the database buffer. Each database buffer resides at its own fixed memory address regardless of use or disuse of the database buffer. In an embodiment, new database buffers may be dynamically added to an elastic idle pool if needed.

Step 202 invokes logic 130 that is defined in guest language 160 to retrieve value 115 from database 110 into database buffer 140 as retrieved value 145. Invoking logic 130 should cause execution (e.g. by interpretation or not) of logic 130 and, in this example, eventual compilation of some or all of logic 130. Between steps 202-203, the compiler generates a compiler graph of a portion or whole of logic 130 from a retained parse tree that may be reused from a same or previous invocation of logic 130. Despite emphasizing static analysis, the analytic steps of FIG. 2 may occur in highly dynamic scenarios such as JIT compilation.

The process of FIG. 2 has two rewriting steps 203 and 206 for respective rewritings of the compiler graph, and the two rewriting steps are separated by novel analysis steps. Herein, analysis, semantic analysis, and static analysis mean compiler graph analysis dedicated to copy avoidance of buffered database values. Generalized compiler analysis (e.g. a decision to inline a subroutine) also occurs in the compiler on the same compiler graph and, as explained later herein, interplay between both kinds of analysis is synergistic.

Static analysis is a general phase of a JIT compiler that is predefined by guest language runtime environment 120. This and other predefined phases may have stock implementations that are extensible and operational in polyglot DBMS 100 but are unaware of polyglot DBMS 100 and unaware of database components 110, 125, and 140. That lack of awareness means that the stock compiler cannot, without extension herein, perform the novel analysis and novel instrumentation herein. Thus, a compilation phase may fuse or sequence a stock behavior with an extended behavior that is any special technique presented herein.

As an example of stock behavior, in step 203, the compiler generally analyzes and optimizes the compiler graph. For example, inlining logic 138 into logic 130 as inlined logic 139 occurs during step 203. Without changing the behavior of logic 130, inlining increases this size and scope of compilation unit 150, which synergistically improves the following analysis steps 204-207 by increased availability in amount or extent of graph nodes, symbols (i.e. identifiers), polymorphic datatype ranges, actual value ranges, and control flow paths. For a retrieved value that analysis would, before inlining, suspect might escape or might cause a liveness violation, inlining may facilitate detecting that the retrieved value, as discussed below, cannot escape and cannot cause a liveness violation within logic 130 and compilation unit 150.

Novel Semantic Analysis for Copy Avoidance

Steps 204-207 are examples of analysis that are extended behaviors specialized for copy avoidance. Step 204 analyzes logic 130 by analyzing the compiler graph to detect that usage of retrieved value 145 cannot occur after retrieved value 145 is overwritten in database buffer 140. In other words, step 204 detects, in logic 130, that no reference to retrieved value 145 can dangle. If logic 130 accesses multiple values in database buffer 140, then step 204 individually detects whether respective usage of each of the multiple values can cause dangling. Thus, step 204 identifies the subset of retrieved values in database buffer 140 whose usage in logic 130 cannot cause dangling.

Step 204 detects database invocations 132-133 that can cause retrieved values to be loaded into database buffer 140. For example, step 204 may detect, in logic 130, all call sites (i.e. invocations) of the get( ) method of database object 125. Database object 125 may have multiple methods that can cause retrieved values to be loaded into database buffer 140. Mentions herein of get( ) may mean all of those multiple methods of database object 125. In an embodiment, there are multiple kinds of database object 125 that each has same or different methods that can cause retrieved values to be loaded into database buffer 140.

Steps 205-206 are sub-steps of analysis step 204, and discussed later herein is escape analysis that step 204 may perform. Step 205 analyzes liveness of retrieved value 145 in logic 130. For example, a local variable in logic 130 may latch the reference to retrieved value 145 as returned by the get( ) method. Step 205 performs dataflow and control flow analysis on the compiler graph to detect if the latched value could still be live (i.e. alive) at next database invocation 133, which may entail any or all of the following analysis detections.

A reference to a retrieved value that is never latched cannot be live at next database invocation 133 unless both database invocations 132-133 occur in a same expression in logic 130.

Assigning the value of the latching variable to another variable causes both variables to be latching variables. In other words, retrieved value 145 may have multiple latching variables.

If the retrieved value is compound (i.e. a data structure with fields that may or may not themselves be nested structures), then any variable that latches a reference to a field of the retrieved value or a nested field or a nested structure becomes a latching variable.

A reference to a retrieved value cannot be live at next database invocation 133 if the latching variable is always reassigned to a different value before control flow reaches next database invocation 133.

A reference to a retrieved value cannot be live at next database invocation 133 if control flow cannot reach database invocation 133 after latching (i.e. at earlier database invocation 132).

Reachability Analysis for Database Content Retrieval

Step 205 may perform reachability analysis within the compiler graph that entails: a) control flow analysis, b) dataflow analysis, and c) interplay between both (a) and (b). For example, dataflow analysis may reveal that the value of a variable always will be null at some graph nodes, and that dataflow analysis may influence control flow analysis that detects that a condition in an if statement will always be false. In that case, the body of the if statement is dead code. If the dead code contains database invocation 133, then database invocation 133 cannot be a next database invocation. However if the body of the if statement is not actually dead code but instead is presumed dead code that is speculatively replaced by a deoptimization point, then the body of the if statement (including database invocation 133) are excluded from the compiler graph as discussed earlier herein, in which case it might be undetermined whether database invocation 133 can or cannot be a next database invocation, which effects liveness analysis and escape analysis as discussed later herein.

Because not all control flow branches have flow that is predictable by static analysis, instead static analysis may identify multiple potential alternative control flow paths that might actually occur. Thus, there may be multiple potential different database invocations that may be a next database invocation after database invocation 132, and these potential next database invocations may be detected by a breadth first search (BFS) starting at the graph node of database invocation 132. This is a multi-target BFS; it does not stop after finding a first potential database invocation. Besides being bounded by the perimeter of the compiler graph itself, the BFS also disregards (i.e. does not traverse) control flow edges that depart from database invocations other than database invocation 132 that is the start of the BFS.

All potential next database invocations should be treated as if each actually is the next database invocation and, if the latching variable that references retrieved value 145 could possibly still be live for at least one of the potential next database invocations, there is a liveness violation. A liveness violation is the detectable possibility that a latched reference to retrieved value 145 might still be live when the next database invocation is reached. If a liveness violation is detected for retrieved value 145, then retrieved value 145 is ineligible for copy avoidance, and instead retained copy 175 should be made for retrieved value 145.

Novel Graph Coloring for Database Content Retrieval

An embodiment may provide, for execution of logic 130, only one database buffer because copy avoidance herein does not require multiple database buffers for logic 130. With only one database buffer, every liveness violation requires making retained copies in memory region 170. In an embodiment, step 205 performs novel graph coloring for logic 130 using multiple database buffers to achieve additional copy avoidance that cannot be achieved with only one database buffer, such as copy avoidance for retrieved value 145 even if retrieved value 145 has a liveness violation.

Step 205 may insert color edges that are undirected semantic edges interconnecting graph nodes of the compiler graph that represent database invocations. Insertion of color edges into the compiler graph is used to generate an interference graph that is a graph component of the compiler graph for further analysis. Step 205 may perform herein specialized graph coloring based on liveness of retrieved values at database invocations in logic 130. A respective, but not necessarily distinct, color is assigned to each of all database invocations in logic 130. Each color may be shared by one or more database invocations.

Each distinct color represents a distinct database buffer. The color of a database invocation indicates which database buffer should the database invocation be configured to use. A color edge represents a liveness violation between two database invocations, and a color edge that connects two database invocations of different respective colors represents a false liveness violation that can be ignored because both database invocations use separate database buffers and thus both database invocations will not interfere with each other. In other words, a color edge that connects two database invocations of different respective colors represents acceleration of logic 130 by avoidance of making a retained copy in memory region 170 for at least one retrieved value from database 110.

The goal of graph coloring herein is to have as few (i.e. ideally none) color edges that connect two database invocations of a same color, which represents an unavoidable making of a retained copy in memory region 170 due to a liveness violation between two database invocations that interfere with each other by sharing a same database buffer. Ideally, multiple (i.e. two or more) database invocations share a database buffer only if there is no liveness violation between every combinatoric pairing of two of those multiple database invocations. Ideally, as many database invocations as possible, which do not between themselves have a liveness violation, share a same database buffer.

A trivial solution that does not use graph coloring entails providing each database invocation in logic 130 with its own respective database buffer such that logic 130 has as many database buffers as logic 130 has database invocations, in which case a liveness violation is unlikely but, as follows, not impossible. The trivial solution is suboptimal if providing an unlimited count of database buffers to accelerate logic 130 also decelerates other logic by depriving other logic of database buffers. However, some boundary cases are unhandled by the trivial solution. For example, the coloring BFS discussed earlier herein may reveal that database invocation 132 is a potential next database invocation for itself. For example, database invocation 132 may occur in a loop in logic 130, in which case database invocation 132 in a previous iteration of the loop may have a liveness violation with database invocation 132 in a next iteration of the loop. The trivial solution cannot be used for a database invocation that is in conflict with itself in that way.

In various embodiments there is or is not a limit on how many colors (i.e. database buffers) are available. In an embodiment, a limit on how many colors fluctuates based on aggregate demand throughout polyglot DBMS 100. For example, two lexical blocks in logic 130 may be compiled at different respective times (e.g. during execution of a single database query or during a same execution of logic 130) with different respective limits on how many colors are available. Due to compilation boundaries discussed earlier herein, separately-compiled (i.e. not compiled together in a same compilation unit) lexical blocks should not share a database buffer.

As explained above, the particular database invocation may have multiple latching variables for various fields and nested structures. For example, the get( ) method of database object 125 may return an array of elements, a flat structure (e.g. dictionary) of fields, or a complex structure having (e.g. recursively) nested substructures. For example, retrieved value 145 may be any semi-structured document, such as JavaScript object notation (JSON) or extensible markup language (XML), that is in an already-parsed memory format such as a document object model (DOM).

In any case, each of many latching variables may be declared by a different respective graph node to latch references to various nested parts of retrieved value 145, and those respective graph nodes may reside in same or different lexical blocks in logic 130. Declaration graph nodes of those latching variables may be widely distributed throughout the compiler graph. A color is live at a graph node if at least one latching variable of that color is live at that graph node. Likewise for escape analysis presented later herein, a color escapes compilation unit 150 if at least one latching variable of that color escapes compilation unit 150.

Copy Avoidance Based on Reference Liveness Analysis

In an embodiment of guest language runtime environment 120 such as Graal that is discussed in above incorporated "Understanding Basic Graal Graphs", all call sites (i.e. subroutine invocation graph nodes, including database invocations and non-database invocations) are accompanied by a respective FrameState graph node that identifies a subset of variables that can possibly be reachable at the call site, which polyglot DBMS 100 uses to detect which latching variables could possibly be live at the call site and, thus, which colors could possibly be live at the call site.

In various embodiments, a liveness violation is resolved either by a) copying all (i.e. all retrieved values) of database buffer 140 into memory region 170 or, to save time and space, by b) making retained copy 175 only for a retrieved value that is live at potential next database invocation 133 and that was retrieved by the database invocation that is the root of a BFS of a same color as that of the potential next database invocation 133.

In other words for a BFS, only for a latching variable that could possibly be live at potential next database invocation 133 (or at any other potential next database invocation reached by the BFS) of a same color, does retained copy 175 need to be selectively made in memory region 170 for a corresponding retrieved value in database buffer 140. In any case and as discussed later herein, it is the database invocation that is the root of the BFS, not potential next database invocation 133, that is instrumented to make that retained copy in memory region 170, unless copy deferral or buffer promotion are used as discussed later for FIG. 3.

Because next database invocation 133 is itself a root of a different BFS, database invocation 133 may likewise be instrumented to make a retained copy of its own retrieved value. That is, each database invocation makes a retained copy of its own respective retrieved value if needed. In other words, some but not all database invocation call sites in logic 130 may need to make retained copies, and those decisions are made before instrumentation so that the instrumentation of a particular call site can be generated to make a retained copy or be generated to not make a retained copy.

Escape Analysis

Herein, liveness analysis is limited to the current compilation unit 150 that might be only a portion of logic 130 such as a lexical block, even if a retained parse tree of the whole of logic 130 is available. The reason for this restriction is due to incremental JIT in which different lexical blocks are compiled at different times so the parse tree may have a dynamically changing patchwork of compiled and uncompiled subtrees. That means that a compiled lexical block may be adjacent in control flow or dataflow to one or more uncompiled lexical blocks that are uninstrumented and cannot enforce any of the guarantees and heuristics herein needed to safely avoid making retained copies. Thus, a retrieved value that is live at the topological perimeter of the current compilation unit has reached, within the retained parse tree, a compilation boundary that should be treated as escape of the retrieved value.

A reference escapes if it could possibly be passed out of compilation unit 150, such as a reference passed from logic 130 to a subroutine invoked by logic 130. Herein, escapes means escapes compilation unit 150. After liveness analysis, if escape analysis by step 205 reveals that a reference to retrieved value 145 escapes, then retained copy 175 should be made for retrieved value 145. In other words, detecting that retrieved value 145 cannot escape may be a prerequisite for copy avoidance.

If step 205 detects that no latching variable of retrieved value 145 could possibly be live at an escape point in the compiler graph such as a subroutine invoked by logic 130, then step 205 detects that no reference to retrieved value 145 can escape through that call site, although some reference to retrieved value 145 might possibly escape through other call site(s) of same or different subroutines. A call site is a potential escape point only if the call site invokes a subroutine that is external to compilation unit 150. For example, logic 138 may be a subroutine that is external to compilation unit 150 only if logic 138 is not inlined as inlined logic 139 into compilation unit 150. If retrieved value 145 could possibly be live at any deoptimization point, retrieved value 145 is treated as both live and escaped at the deoptimization point, which is a status that might change when deoptimization later replaces the deoptimization point, and in some cases can beneficially change a retrieved value from escaped to not escaped.

References to retrieved values or to their fields or nested substructures are not the only references whose escape should be detected. Logic 130 may have many database invocations, some or all of which expressly use database object 125. Escape analysis can detect whether or not a reference to database object 125 itself can escape. If a graph node is an escape point for database object 125, then all references to retrieved values that could possibly be live at that graph node are also treated as escaped and needing retained copies in memory region 170.

Database object 125 also can detectably escape in another way as follows. As discussed earlier herein, there may be multiple instances of database object 125. For example, logic 130 may instantiate zero or more new instances of database object 125 and may otherwise obtain references to zero or more other instances of database object 125. Thus, logic 130 may have a mix of instances of database object 125 that includes: a) some already existing instances that are globally shared or otherwise provided from logic outside of logic 130, b) some instances that instead are always local (i.e. private) to logic 130, and c) some instances that are created as local by logic 130 but then could possibly escape.

Here, (b) and, to some extent, (c) are handled by liveness and escape analysis as discussed above. In the case of (c), where an originally local instance of database object 125 escapes somewhere in the compiler graph, any database invocation that uses an escaped instance of database object 125 returns a reference to a retrieved value that is always itself treated as escaped. For that retrieved value, a retained copy should be made in memory region 170.

Above, (a) is detected and handled as follows. If analysis reveals that an instance of database object 125 is neither constructed nor initialized in logic 130, then that instance is external (e.g. global) to logic 130. An external instance is always treated as escaped, and all retrieved values provided by an external instance of database object 125 are themselves always treated as escaped.

Copy Avoidance Instrumentation

In this example, analytic step 205 detects that it is safe to avoid making a retained copy in memory region 170 for retrieved value 145. Using rewriting, step 206 instruments the compiler graph according to any techniques presented herein. In other words, step 206 instruments logic 130.

With all database invocations that can avoid copies identified, the compiler graph is rewritten by step 206 to insert instrumentation into logic 130 to propagate copy avoidance information during runtime. The analysis from step 205 is passed as hints to logic 130 as instrumented by step 206. Each database invocation may contain a hidden (i.e. instrumented) Boolean argument that is true by default and invisible to logic 130 before instrumentation. This Boolean argument is the doCopy flag that is discussed later with FIG. 3 for buffer promotion.

If the compiler optimization phase detected that a copy can be avoided, this argument is rewritten to false. That hint to instrumented logic 130 during runtime indicates that a copy for that particular database invocation can be avoided.

Proxy 174 can be used by instrumented logic 130, and the instrumentation inserted into logic 130 is responsible for performing a copy into memory region 170 or not based on that rewritable flag.

Object code generation by the backend of the compiler occurs between steps 206-207. Step 207 executes instrumented logic 130 without, after retrieved value 145 is overwritten in database buffer 140, having a retained copy of retrieved value 145 in memory region 170 that guest language runtime environment 120 manages. In other words, step 207 executes logic 130 without making a retained copy of retrieved value 145, which accelerates logic 130.

Example Finite State Machine (FSM) for Buffer Promotion when Deoptimizing

Figure 3:
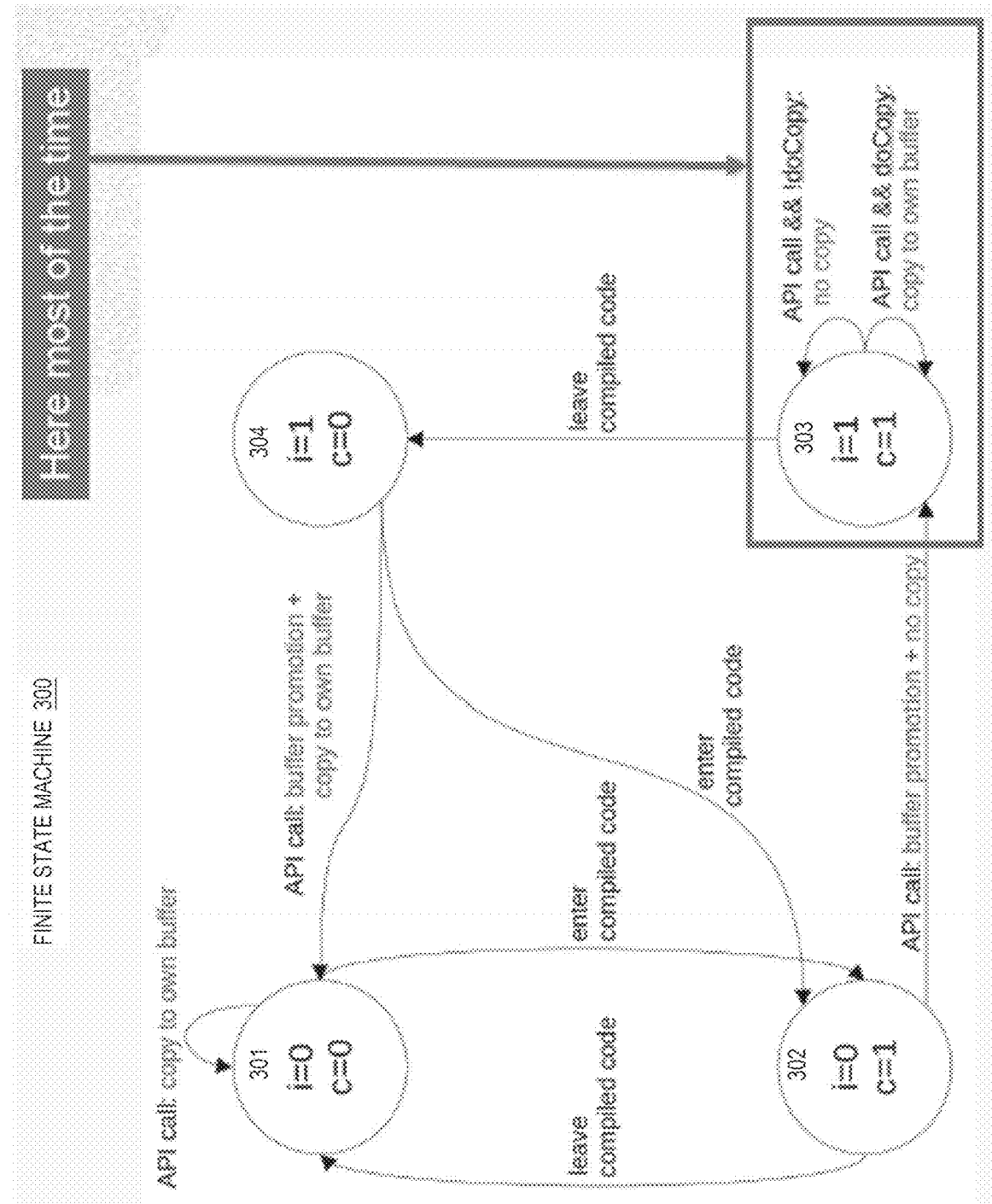
FIG. 3 is a flow diagram that depicts an example finite state machine (FSM) that has transitions, instrumented within guest logic, between states of the FSM.

FIG. 3 is a flow diagram that depicts example finite state machine (FSM) 300 in an embodiment of polyglot DBMS 100. FSM 300 has transitions (shown as arrows), instrumented within logic 130, between states 301-304 of FSM 300. The instrumented transitions facilitates buffer promotion that defers making retained copies in memory region 170, which may accelerate logic 130 by increased avoidance of copying as follows. FIG. 3 is discussed with reference to FIG. 1.

This example has interpretation, JIT compilation, object code execution and, demonstratively, only one database buffer. For reasons discussed earlier herein, making retained copies may be needed for control to cross back and forth between compiled and interpreted (i.e. uncompiled) logic. For example, logic 130 may have many deoptimization points that defensively need retained copies to be made but only because the pruned deoptimized logic is unavailable for analysis as discussed earlier herein.

As discussed earlier herein, conditions such as escape or a liveness violation are potentialities for data being wrongly overwritten that should, for safety, always be accommodated, by making retained copies, unless analysis herein detects that an overwriting potentiality is excluded because the overwriting provably cannot occur. For example, analysis might detect that escape cannot occur, or a deoptimization point might prevent that detection.

Orchestration by FSM 300 uses buffer promotion to relax the escape analysis to let references to retrieved values escape through deoptimization points without sacrificing safety. Thus with FSM 300, a retrieved value that escapes through a deoptimization point does not, as suggested earlier herein, require defensively (i.e. proactive, eager) making a retained copy in memory region 170. Instead, making a retained copy is deferred until deoptimization actually occurs (i.e. when speculatively eliminated code suddenly needs execution). For example, deoptimization of a particular deoptimization point might never occur during an execution of logic 130, in which case the deferred copy may actually be an avoided copy, which accelerates the execution of logic 130.

In an overcautious embodiment, all overwriting potentialities that cannot be analytically excluded are, for safety, accommodated by proactively making retained copies in memory region 170 as soon as retrieved values are loaded into database buffer 140 from database 110. However, that does not mean that the retained copies that are proactively made will actually be necessary to prevent a dangling reference. For example as discussed earlier herein, a boundary between compiled and uncompiled portions of logic 130 may cause defensive making of retained copies in memory region 170 without having any ability to foresee that interpretation of uncompiled deoptimized logic 135 can or cannot cause an already-latched reference to dangle.

Copy Deferral

FSM 300 facilitates deferring a decision to copy retrieved data into memory region 170 and, in many cases, that indefinite postponement may be sufficient for retrieved value 145 in database buffer 140 to become no longer live (i.e. unreferenced or still referenced only for past use), such as when the enclosing scope of a latching local variable ceases. Deferring copying retrieved data until a liveness violation actually occurs in logic 130 also is copy avoidance so long as that liveness violation incidentally never actually occurs during that execution of logic 130.

Deferred copying that cannot be avoided is detected and managed by state transitions of FSM 300. If making a retained copy of a retrieved value can no longer be deferred due to sudden deoptimization, a state transition of FSM 300 detects and handles this, not by selectively making a retained copy of some retrieved values, but instead by copying all of (i.e. all retrieved values in) database buffer 140 into memory region 170. Copying all retrieved values from database buffer 140 may entail a single memory transfer spanning many contiguous memory addresses. In other words, database buffer 140 may be copied into memory region 170 in a same way as any array of any type would be copied.

State 301 may be a default initial state of FSM 300. Each execution of logic 130 respectively has its own instance of FSM 300. For example if logic 130 is a filtration UDF separately invoked (i.e. executed) for each table row during a table scan by a query on database 110, then each row is separately processed by logic 130 according to a new (or reused and reinitialized) instance of FSM 300. However, the initial state of a particular instance of FSM 300 depends on the compilation status of the first lexical block in logic 130. Initially, the first lexical block in logic 130 may be uncompiled and interpreted, in which case instances of FSM 300 start in interpreted state 301. Eventually, the first lexical block in logic 130 may be compiled, in which case instances of FSM 300 generated after that compilation instead start in compiled state 302. Distinctions between interpreted and compiled states are discussed later herein. In an embodiment, each of database invocations 132-133 may have its own instance of FSM 300.

In one example, concurrent processing of multiple rows may be by concurrent executions (e.g. on multiple CPU cores) of logic 130 that have separate respective instances of FSM 300 that independently transition between states, and two instances of FSM 300 may simultaneously be in same or different respective states. Independence of instances of FSM 300 occurs even if multiple (e.g. all) executions of logic 130 share a same retained parse tree that is designed to be thread safe. However, independence of each instance of FSM 300 means that FSM 300 itself is single threaded and does not have to be thread safe. For example, two CPU cores may simultaneously JIT compile different respective lexical blocks of logic 130 while parallel processing two respective table rows during a same table scan.

The following example demonstratively lacks parallelism and has only a single thread with a single instance of FSM 300. The current state of FSM 300 is not based on which lexical block of logic 130 is currently executing. For example without causing a state transition, execution of logic 130 may flow between two lexical blocks that both were separately JIT compiled at different times for a same or different thread (i.e. execution of logic 130) or compiled at a same past time by different threads for different executions of logic 130. Instead, a state transition only occurs when a database invocation by logic 130 occurs or when execution switches from compiled to interpreted or vice versa.

Transition Instrumentation

The following are indicated by shown status c that tracks how a lexical block of logic 130 should be executed. In states 301 and 304, c is zero that indicates execution by interpretation. In states 302-303, c is one that instead indicates executing compiled code. In other words, c is a Boolean. Shown status i is a Boolean that, when true, indicates that a last (i.e. most recent) database invocation to actually occur in logic 130 was (e.g. in the current execution of logic 130 or a previous execution) performed by instrumentation in the current compilation unit, not in a different compilation unit of logic 130, and not during execution by interpretation. Every database invocation inside a compiled lexical block will set i to one. Whenever a compiled lexical block is entered from an uncompiled lexical block, i is reset to zero.

If i is one and the next database invocation is happening in an uncompiled lexical block, buffer promotion is performed if the last database invocation performed copy avoidance. If i is zero, it does not matter whether the next database invocation is happening in an uncompiled lexical block or not, and buffer promotion is performed if the last database invocation performed copy avoidance.

As discussed earlier herein, shown doCopy is the instrumented Boolean argument inserted by instrumentation step 206 of FIG. 2. By that novel instrumentation in logic 130, doCopy controls timing and selection of RAM for storing (e.g. loading or copying) retrieved values as shown and as follows. Some transitions in FIG. 3 have various shown labels, some of which are enumerated as follows and are performed in various shown combinations.

a. "API call" means any of many database invocations 132-133.
b. "copy to own buffer" means, when loading value 115 from database 110 into database buffer 140 as retrieved value 145, making an unavoidable retained copy in memory region 170 only for retrieved value 145, not the whole of database buffer 140. This is not buffer promotion.
c. "no copy" means, when loading value 115 from database 110 into database buffer 140 as retrieved value 145, and as taught herein either deferral of copying or copy avoidance.
d. "doCopy" is a Boolean that indicates a need to make an unavoidable retained copy in memory region 170 only for retrieved value 145, not the whole of database buffer 140. This is not buffer promotion. As discussed earlier, shown doCopy is the instrumented Boolean argument inserted by instrumentation step 206 of FIG. 2.
e. "!doCopy" indicates copy avoidance as taught herein because overwriting the previous contents of database buffer 140, by state 303 performing (a)-(b), is certainly harmless as detected by novel analysis earlier herein. This acceleration is magnified because FSM 300 spends most of its lifecycle in state 303.
f. "buffer promotion" means copying (e.g. in to as a whole) already-loaded database buffer 140 into a (e.g. newly allocated and/or same-sized) chunk in memory region 170, which is implemented by instrumentation in logic 130 in a way that is transparent to uninstrumented logic 130. This moves the previous contents of database buffer 140 safely out of the way to avoid being lost even though (a) will immediately overwrite the previous contents of database buffer 140.
g. "buffer promotion+copy to own buffer" means performing (f) for the previous contents of database buffer 140 immediately before (b).
h. "buffer promotion+no copy" means performing (f) for the previous contents of database buffer 140 immediately before (c).

In those ways, FSM 300 is operated by instrumentation to accelerate logic 130.

Database Overview

Embodiments of the present invention are used in the context of database management systems (DBMSs). Therefore, a description of an example DBMS is provided.

Generally, a server, such as a database server, is a combination of integrated software components and an allocation of computational resources, such as memory, a node, and processes on the node for executing the integrated software components, where the combination of the software and computational resources are dedicated to providing a particular type of function on behalf of clients of the server. A database server governs and facilitates access to a particular database, processing requests by clients to access the database.

Users interact with a database server of a DBMS by submitting to the database server commands that cause the database server to perform operations on data stored in a database. A user may be one or more applications running on a client computer that interact with a database server. Multiple users may also be referred to herein collectively as a user.

A database comprises data and a database dictionary that is stored on a persistent memory mechanism, such as a set of hard disks. A database is defined by its own separate database dictionary. A database dictionary comprises metadata that defines database objects contained in a database. In effect, a database dictionary defines much of a database. Database objects include tables, table columns, and tablespaces. A tablespace is a set of one or more files that are used to store the data for various types of database objects, such as a table. If data for a database object is stored in a tablespace, a database dictionary maps a database object to one or more tablespaces that hold the data for the database object.

A database dictionary is referred to by a DBMS to determine how to execute database commands submitted to a DBMS. Database commands can access the database objects that are defined by the dictionary.

A database command may be in the form of a database statement. For the database server to process the database statements, the database statements must conform to a database language supported by the database server. One non-limiting example of a database language that is supported by many database servers is SQL, including proprietary forms of SQL supported by such database servers as Oracle, (e.g. Oracle Database 11g). SQL data definition language ("DDL") instructions are issued to a database server to create or configure database objects, such as tables, views, or complex types. Data manipulation language ("DML") instructions are issued to a DBMS to manage data stored within a database structure. For instance, SELECT, INSERT, UPDATE, and DELETE are common examples of DML instructions found in some SQL implementations. SQL/XML is a common extension of SQL used when manipulating XML data in an object-relational database.

A multi-node database management system is made up of interconnected nodes that share access to the same database. Typically, the nodes are interconnected via a network and share access, in varying degrees, to shared storage, e.g.

shared access to a set of disk drives and data blocks stored thereon. The nodes in a multi-node database system may be in the form of a group of computers (e.g. work stations, personal computers) that are interconnected via a network. Alternately, the nodes may be the nodes of a grid, which is composed of nodes in the form of server blades interconnected with other server blades on a rack.

Each node in a multi-node database system hosts a database server. A server, such as a database server, is a combination of integrated software components and an allocation of computational resources, such as memory, a node, and processes on the node for executing the integrated software components on a processor, the combination of the software and computational resources being dedicated to performing a particular function on behalf of one or more clients.

Resources from multiple nodes in a multi-node database system can be allocated to running a particular database server's software. Each combination of the software and allocation of resources from a node is a server that is referred to herein as a "server instance" or "instance". A database server may comprise multiple database instances, some or all of which are running on separate computers, including separate server blades.

Query Processing

A query is an expression, command, or set of commands that, when executed, causes a server to perform one or more operations on a set of data. A query may specify source data object(s), such as table(s), column(s), view(s), or snapshot(s), from which result set(s) are to be determined. For example, the source data object(s) may appear in a FROM clause of a Structured Query Language ("SQL") query. SQL is a well-known example language for querying database objects. As used herein, the term "query" is used to refer to any form of representing a query, including a query in the form of a database statement and any data structure used for internal query representation. The term "table" refers to any source object that is referenced or defined by a query and that represents a set of rows, such as a database table, view, or an inline query block, such as an inline view or subquery.

The query may perform operations on data from the source data object(s) on a row by-row basis as the object(s) are loaded or on the entire source data object(s) after the object(s) have been loaded. A result set generated by some operation(s) may be made available to other operation(s), and, in this manner, the result set may be filtered out or narrowed based on some criteria, and/or joined or combined with other result set(s) and/or other source data object(s).

A subquery is a portion or component of a query that is distinct from other portion(s) or component(s) of the query and that may be evaluated separately (i.e., as a separate query) from the other portion(s) or component(s) of the query. The other portion(s) or component(s) of the query may form an outer query, which may or may not include other subqueries. A subquery nested in the outer query may be separately evaluated one or more times while a result is computed for the outer query.

Generally, a query parser receives a query statement and generates an internal query representation of the query statement. Typically, the internal query representation is a set of interlinked data structures that represent various components and structures of a query statement.

The internal query representation may be in the form of a graph of nodes, each interlinked data structure corresponding to a node and to a component of the represented query statement. The internal representation is typically generated in memory for evaluation, manipulation, and transformation.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 4:
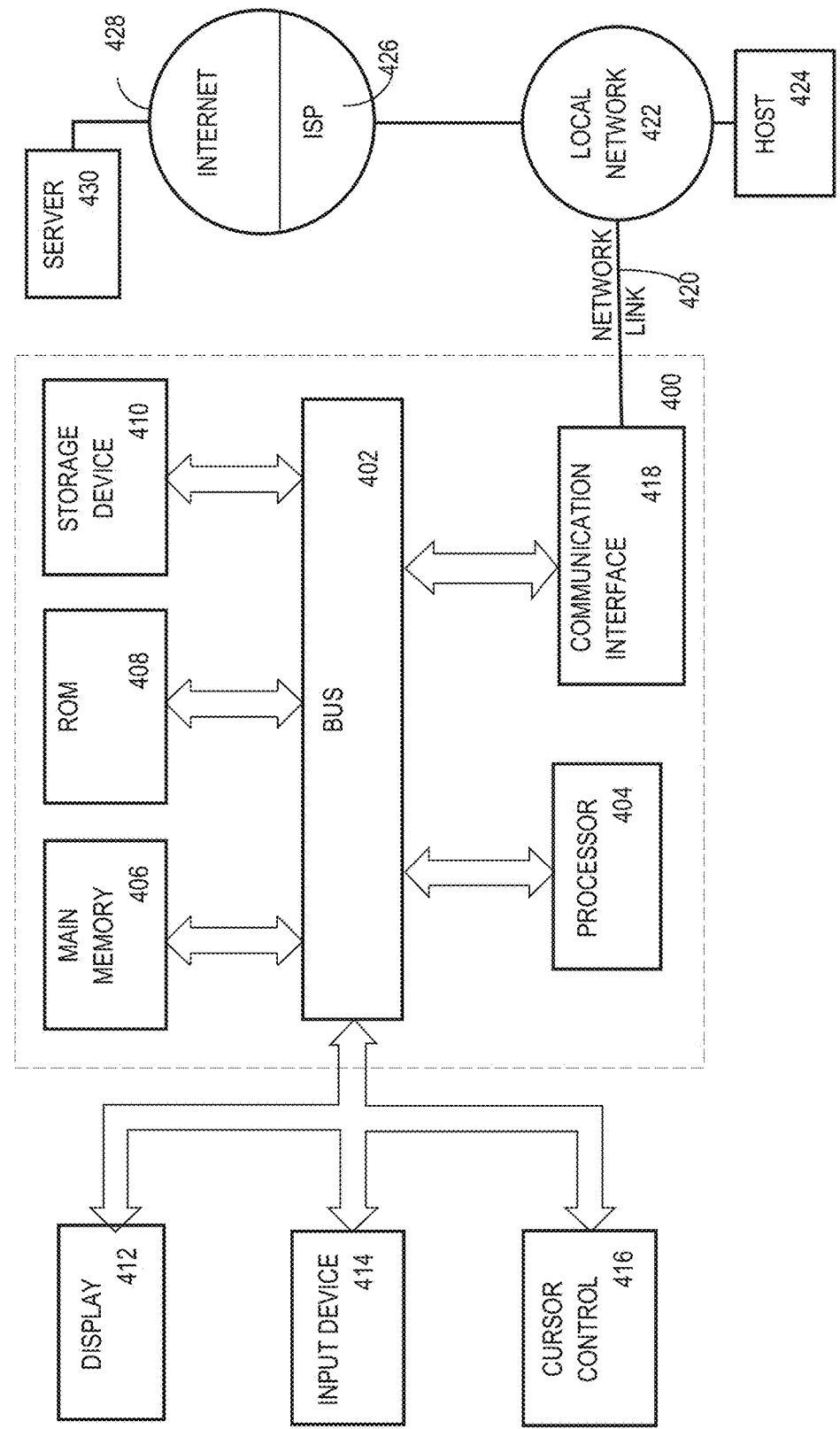
FIG. 4 is a block diagram that illustrates a computer system upon which an embodiment of the invention may be implemented.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk, optical disk, or solid-state drive is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 410. Volatile media includes dynamic memory, such as main memory 406. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid-state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

Software Overview

Figure 5:
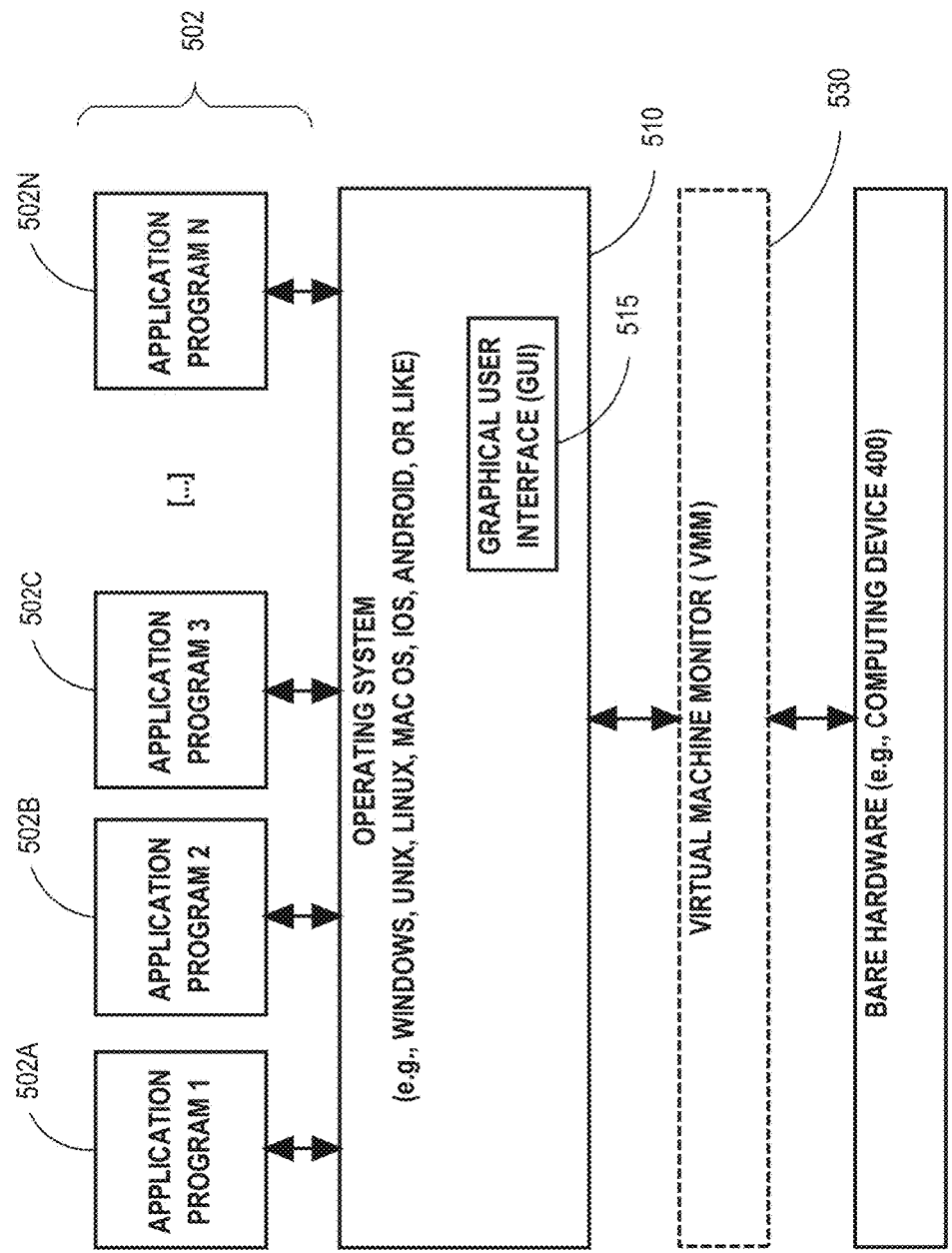
FIG. 5 is a block diagram that illustrates a basic software system that may be employed for controlling the operation of a computing system.

FIG. 5 is a block diagram of a basic software system 500 that may be employed for controlling the operation of computing system 400. Software system 500 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 500 is provided for directing the operation of computing system 400. Software system 500, which may be stored in system memory (RAM) 406 and on fixed storage (e.g., hard disk or flash memory) 410, includes a kernel or operating system (OS) 510.

The OS 510 manages low-level aspects of computer operation, including managing execution of processes, memory allocation, file input and output (I/O), and device I/O. One or more application programs, represented as 502A, 502B, 502C . . . 502N, may be "loaded" (e.g., transferred from fixed storage 410 into memory 406) for execution by the system 500. The applications or other software intended for use on computer system 400 may also be stored as a set of downloadable computer-executable instructions, for example, for downloading and installation from an Internet location (e.g., a Web server, an app store, or other online service).

Software system 500 includes a graphical user interface (GUI) 515, for receiving user commands and data in a graphical (e.g., "point-and-click" or "touch gesture") fashion. These inputs, in turn, may be acted upon by the system 500 in accordance with instructions from operating system 510 and/or application(s) 502. The GUI 515 also serves to display the results of operation from the OS 510 and application(s) 502, whereupon the user may supply additional inputs or terminate the session (e.g., log off).

OS 510 can execute directly on the bare hardware 520 (e.g., processor(s) 404) of computer system 400. Alternatively, a hypervisor or virtual machine monitor (VMM) 530 may be interposed between the bare hardware 520 and the OS 510. In this configuration, VMM 530 acts as a software "cushion" or virtualization layer between the OS 510 and the bare hardware 520 of the computer system 400.

VMM 530 instantiates and runs one or more virtual machine instances ("guest machines"). Each guest machine comprises a "guest" operating system, such as OS 510, and one or more applications, such as application(s) 502, designed to execute on the guest operating system. The VMM 530 presents the guest operating systems with a virtual operating platform and manages the execution of the guest operating systems.

In some instances, the VMM 530 may allow a guest operating system to run as if it is running on the bare hardware 520 of computer system 500 directly. In these instances, the same version of the guest operating system configured to execute on the bare hardware 520 directly may also execute on VMM 530 without modification or reconfiguration. In other words, VMM 530 may provide full hardware and CPU virtualization to a guest operating system in some instances.

In other instances, a guest operating system may be specially designed or configured to execute on VMM 530 for efficiency. In these instances, the guest operating system is "aware" that it executes on a virtual machine monitor. In other words, VMM 530 may provide para-virtualization to a guest operating system in some instances.

A computer system process comprises an allotment of hardware processor time, and an allotment of memory (physical and/or virtual), the allotment of memory being for storing instructions executed by the hardware processor, for storing data generated by the hardware processor executing the instructions, and/or for storing the hardware processor state (e.g. content of registers) between allotments of the hardware processor time when the computer system process is not running. Computer system processes run under the control of an operating system, and may run under the control of other programs being executed on the computer system.

Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprise two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure and applications.

The above-described basic computer hardware and software and cloud computing environment presented for purpose of illustrating the basic underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
configuring, in a polyglot database management system (DBMS) that contains a guest language runtime environment, a database buffer that the guest language runtime environment does not manage;
invoking, in the polyglot DBMS, logic that is defined in a guest language to retrieve, into the database buffer that the guest language runtime environment does not manage, a value stored in a database in the polyglot DBMS, wherein the logic contains a plurality of database invocations;
assigning a color respectively to each database invocation of the plurality of database invocations; and
executing, based on the colors of the database invocations, the logic without, after the retrieved value is overwritten in the database buffer, retaining a retained copy of the retrieved value in a memory region that the guest language runtime environment manages.

2. The method of claim 1 further comprising generating an interference graph.

3. The method of claim 2 wherein the interference graph is a component of a compiler graph.

4. The method of claim 3 wherein said generating the interference graph comprises inserting a color edge into the compiler graph.

5. The method of claim 4 wherein the compiler graph contains a distinct node respectively for each database invocation of the plurality of database invocations.

6. The method of claim 5 wherein the color edge connects nodes of two database invocations of the plurality of database invocations.

7. The method of claim 6 wherein the two database invocations of the plurality of database invocations are one selected from a group consisting of two database invocations that have a same color and two database invocations that have distinct respective colors.

8. The method of claim 6 wherein:
the method further comprises detecting liveness of a particular variable at the two database invocations of the plurality of database invocations;
said inserting the color edge is responsive to said detecting.

9. The method of claim 8 wherein said detecting liveness comprises detecting reachability in the compiler graph for a second database invocation of the plurality of database invocations from a first database invocation of the plurality of database invocations.

10. The method of claim 4 not comprising assigning a color to the color edge.

11. The method of claim 1 further comprising exclusively allocating the database buffer to one component selected from a group consisting of: a database request, a database statement, a database session, a database client, a computational thread, a stored procedure, a user defined function, and said logic.

12. The method of claim 11 further comprising allocating, to the component, a plurality of database buffers that includes said database buffer.

13. The method of claim 12 further comprising assigning a distinct color respectively to each database buffer of the plurality of database buffers.

14. The method of claim 13 wherein the color of a particular database invocation of the plurality of database invocations indicates which database buffer of the plurality of database buffers is allocated to the particular database invocation.

15. The method of claim 14 further comprising allocating a first database buffer of the plurality of database buffers to a first database invocation of the plurality of database invocations and a second database buffer of the plurality of database buffers to a second database invocation of the plurality of database invocations.

16. The method of claim 1 wherein:
said invoking is a first invoking;
said assigning is a first assigning;
the method further comprises:
second invoking said logic;
second assigning a color respectively to each database invocation of the plurality of database invocations.

17. The method of claim 16 wherein:
said first assigning is limited to a first maximum count of colors;
said second assigning is limited to a second maximum count of colors that is not the first maximum count of colors.

18. The method of claim 1 not comprising limiting how many colors can be assigned.

19. One or more non-transitory computer-readable media storing instructions that, when executed by one or more processors, cause:
configuring, in a polyglot database management system (DBMS) that contains a guest language runtime environment, a database buffer that the guest language runtime environment does not manage;
invoking, in the polyglot DBMS, logic that is defined in a guest language to retrieve, into the database buffer that the guest language runtime environment does not manage, a value stored in a database in the polyglot DBMS, wherein the logic contains a plurality of database invocations;
assigning a color respectively to each database invocation of the plurality of database invocations; and
executing, based on the colors of the database invocations, the logic without, after the retrieved value is overwritten in the database buffer, retaining a retained copy of the retrieved value in a memory region that the guest language runtime environment manages.

20. The one or more non-transitory computer-readable media of claim 19 wherein the instructions further cause generating an interference graph.

21. The one or more non-transitory computer-readable media of claim 20 wherein the interference graph is a component of a compiler graph.

22. The one or more non-transitory computer-readable media of claim 21 wherein said generating the interference graph comprises inserting a color edge into the compiler graph.

23. The one or more non-transitory computer-readable media of claim 22 wherein the compiler graph contains a distinct node respectively for each database invocation of the plurality of database invocations.

24. The one or more non-transitory computer-readable media of claim 19 wherein the instructions further cause exclusively allocating the database buffer to one component selected from a group consisting of: a database request, a database statement, a database session, a database client, a computational thread, a stored procedure, a user defined function, and said logic.

* * * * *